(12) United States Patent
Zuidervaart et al.

(10) Patent No.: US 11,399,652 B2
(45) Date of Patent: Aug. 2, 2022

(54) METHOD AND DEVICE FOR PROVIDING A COFFEE BEVERAGE WITH REDUCED TERPENE CONTENT

(71) Applicant: KONINKLIJKE PHILIPS N.V., Eindhoven (NL)

(72) Inventors: Jasper Zuidervaart, Eindhoven (NL); Mart Kornelis-Jan Te Velde, Eindhoven (NL); Johannes Marra, Eindhoven (NL); Anna Louise Wijnoltz, Eindhoven (NL); Nicole Petronella Martien Haex, Eindhoven (NL); Nicolaas Petrus Willard, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 359 days.

(21) Appl. No.: 16/474,352

(22) PCT Filed: Dec. 26, 2017

(86) PCT No.: PCT/EP2017/084582
§ 371 (c)(1),
(2) Date: Jun. 27, 2019

(87) PCT Pub. No.: WO2018/122218
PCT Pub. Date: Jul. 5, 2018

(65) Prior Publication Data
US 2020/0000267 A1 Jan. 2, 2020

(30) Foreign Application Priority Data

Dec. 29, 2016 (EP) .................................... 16207408

(51) Int. Cl.
*A47J 31/06* (2006.01)
*A23F 5/16* (2006.01)
*A23F 5/26* (2006.01)

(52) U.S. Cl.
CPC ............ *A47J 31/0652* (2013.01); *A23F 5/16* (2013.01); *A23F 5/262* (2013.01); *A47J 31/0668* (2013.01)

(58) Field of Classification Search
CPC ..... A47J 31/0652; A47J 31/0668; A23F 5/16; A23F 5/262
See application file for complete search history.

(56) References Cited

U.S. PATENT DOCUMENTS

| 2004/0022883 A1 | 2/2004 | Brovelli et al. |
| 2008/0038441 A1 | 2/2008 | Kirschner |

(Continued)

FOREIGN PATENT DOCUMENTS

| CA | 2982008 A1 | 11/2016 |
| CN | 1780574 A | 5/2006 |

(Continued)

OTHER PUBLICATIONS

Translation for DE102011110312 published Nov. 2012.*
(Continued)

*Primary Examiner* — Anthony J Weier
(74) *Attorney, Agent, or Firm* — Schott, P.C.

(57) ABSTRACT

A method and apparatus provides a coffee beverage having a reduced terpene content, where a brew chamber has a brew area A is provided and a volume of water is provided to flow through the coffee grounds in the brew chamber and out of the brew chamber to provide a coffee beverage, and where the flow rate of water provided through coffee grounds in the brew chamber is F and the ratio of F/A is about 0.15 cm/s or less.

18 Claims, 4 Drawing Sheets

(56) References Cited

U.S. PATENT DOCUMENTS

| | | | |
|---|---|---|---|
| 2008/0187638 A1* | 8/2008 | Hansen | A47J 31/4492 426/433 |
| 2012/0127870 A1* | 5/2012 | Zhao | H04L 25/03133 370/252 |
| 2014/0178559 A1* | 6/2014 | Neace, Jr. | A23F 5/26 426/594 |
| 2016/0073655 A1 | 3/2016 | Mistry et al. | |
| 2018/0206514 A1* | 7/2018 | Birch | A23F 5/483 |
| 2019/0335944 A1* | 11/2019 | Zuidervaart | A47J 31/3671 |
| 2020/0352386 A1* | 11/2020 | Talon | A47J 31/407 |

FOREIGN PATENT DOCUMENTS

| | | | |
|---|---|---|---|
| CN | 102665848 A | | 9/2012 |
| CN | 106413415 A | | 2/2017 |
| DE | 102011110312 | * | 11/2012 |
| EP | 1129623 A1 | | 9/2001 |
| EP | 1440640 A2 | | 7/2004 |
| EP | 1440903 A1 | | 7/2004 |
| EP | 2721971 A1 | | 4/2014 |
| EP | 1440640 B2 | | 6/2014 |
| FR | 2442016 | * | 6/1980 |
| WO | 2010076048 A1 | | 7/2010 |
| WO | 2013017842 A1 | | 2/2013 |
| WO | 2015197340 A1 | | 12/2015 |

OTHER PUBLICATIONS

Translation for FR2442016 published Jun. 1980.*
Coffee Machine, Product documentation of La Cimbali M31 Classic, Jan. 2001.
Schomer, D. C., "Espresso Coffee: Professional Techniques", pp. 156, 2004.
Espresso Machines, Retrieved from the Internet URL: https://www.home-barista.com/espresso-machines/does-basket-diameter-matter-t7635-10.html, pp. 1-5, Jan. 24, 2009.
Moeenfard, M., et al., "Diterpenes in espresso coffee: impact of preparation parameters", Eur Food Res Technol, vol. 240, pp. 763-773, 2015.
Espresso Coffee Tamper Base Sizing Chart, Retrieved from the Internet URL: http://www.fareastcomponents.net/BasesizeChart.htm, pp. 1-2, Feb. 23, 2016.
Gomez, O. S., "Converting Brix to TDS: An Independent Study", pp. 1-28, Sep. 2019.

* cited by examiner

METHOD AND DEVICE FOR PROVIDING A COFFEE BEVERAGE WITH REDUCED TERPENE CONTENT

CROSS-REFERENCE TO RELATED APPLICATION

This application is a U.S. National Phase application under 35 U.S.C. § 371 of International Application No. PCT/EP2017/084582, filed on Dec. 26, 2017, which claims the benefit of International Application No. 16207408.2 filed on Dec. 29, 2016. These applications are hereby incorporated by reference herein.

FIELD OF THE INVENTION

The invention relates to reducing the amount of terpenes in a coffee beverage, in particular reducing the amount of diterpenes such as cafestol and/or kahweol. This invention also relates to a method for providing a coffee beverage having a reduced terpene content and an apparatus for providing a coffee beverage having a reduced terpene content.

BACKGROUND OF THE INVENTION

Terpenes, particularly diterpenes such as cafestol and/or kahweol are found in the lipid fraction of coffee beans. Though these compounds have been associated with providing some possible health benefits they have also been associated with increasing the levels of low density cholesterol (so-called "bad cholesterol" or LDL cholesterol) in coffee drinkers. Increasing levels of LDL cholesterol is linked to increased risk of cardiovascular diseases. Different types of coffee contain cafestol and kahweol to varying extents. Cafestol and kahweol are generally only present in at most minimal amounts in filter coffee due to the low pressures involved and also because they are absorbed in filter paper. However, in non-filter coffees such as espressos, French press coffee and Turkish coffee they are present in significantly greater amounts. Cafestol in particular has been found to be a potent cholesterol-elevating compound. US 2008/0038441 A1 relates to a low-cholesterol brewed beverage dispenser which uses a filter to remove high cholesterol oils from a brewed beverage.

Hence there is a need for methods and associated apparatus for controlling or decreasing the amounts of kahweol and/or cafestol in coffee and preferably without impacting adversely on the intensity and/or taste and the cost associated with preparing coffee. For example, it would be preferable to obtain healthier coffee without having to resort to chemical means for decreasing the amounts of cafestol and kahweol in coffee.

SUMMARY OF THE INVENTION

It is an object of the present invention to provide a coffee beverage produced from coffee grounds, the resulting coffee beverage having a reduced terpene content, in particular a reduced diterpene (such as cafestol and/or kahweol) content.

The present invention is based on the surprising finding that the amounts of terpenes in a coffee beverage, in particular diterpenes such as cafestol and/or kahweol may be reduced by increasing the diameter of a brew chamber in which coffee grounds are brewed. The present inventors have found that increasing the diameter of the brew chamber for a given amount of coffee grounds reduces the terpene content of a coffee beverage produced without impacting the taste of the coffee beverage.

The present invention provides a method of reducing the terpene content in a coffee beverage by increasing the brew area of a brew chamber for supporting coffee grounds.

According to a first aspect of the invention, there is provided a method for providing a coffee beverage having a reduced terpene content. The method may comprise:

providing a brew chamber supporting coffee grounds, the brew chamber having a brew area A; and providing a volume of water V to flow through the coffee grounds in the brew chamber and out of the brew chamber to provide a coffee beverage, wherein the flow rate of water through the coffee grounds F is V/t, where t is the time taken for the volume of water to flow through the coffee grounds, wherein the ratio of F/A is about 0.15 cm/s or less.

In a second aspect, there is provided an espresso producing apparatus for providing an espresso coffee beverage having a reduced terpene content. The apparatus may comprise:

a brew chamber for holding coffee grounds, the brew chamber having an inlet for receiving a volume of water and an outlet through which a coffee beverage produced in the brew chamber exits the brew chamber, wherein the brew chamber has a brew area A of at least about 20 cm2; and a water supply unit configured to supply a volume of water to the brew chamber at a flow rate F such that the ratio F/A is about 0.15 cm/s or less.

In a third aspect, there is provided the use of a brew chamber to provide an espresso coffee beverage having a reduced terpene content, wherein the brew chamber has a brew area A of at least about 20 cm2.

An advantage of the method and associated apparatus according to the present invention is that lower levels of terpenes, in particular diterpenes such as cafestol and kahweol, are present in the coffee beverage prepared from coffee grounds without adversely impacting on the strength (e.g. intensity) of the coffee beverage and/or taste of the coffee beverage and in a manner which is convenient for the user. The objectives of the invention are achieved without, for example, having to resort to the use of additional chemicals.

The term "terpenes" refers to a class of organic compounds produced by plants. The term "terpenes" used herein is used to refer to free terpenes and terpene esters, for example free diterpenes and diterpene esters. Likewise, the term "diterpenes" is used to refer to free diterpenes and diterpene esters. The terms "cafestol", "kahweol" and "16-O-methylcafestol" are also used to refer to their free diterpenes and esters. Diterpenes include compounds such as cafestol, kahweol and 16-O-methylcafestol the structures of which are shown below where R is H (e.g. the compound may be referred as a "free terpene") or a fatty acid (e.g. the compound may be referred as a "terpene ester"), such as palmitate.

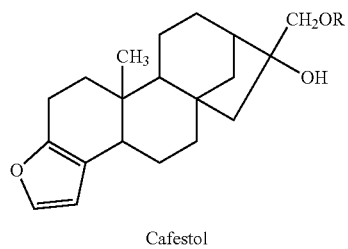

Cafestol

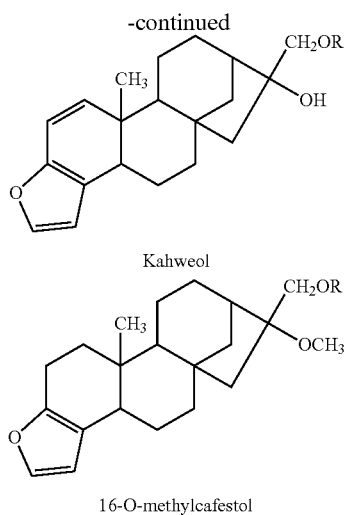

Kahweol

16-O-methylcafestol

The method and apparatus described herein provide a coffee beverage having a reduced terpene content. In certain embodiments, the terpene content is the diterpene content of the coffee beverage, for example the cafestol, kahweol and 16-O-methylcafestol content of the coffee beverage. In certain embodiments, the terpene content is the cafestol and/or kahweol content of the coffee beverage. In certain embodiments the terpene content is the cafestol content of the coffee beverage. In certain embodiments the terpene content is the kahweol content of the coffee beverage.

In certain embodiments, a "reduced terpene content" refers to a reduction in terpene concentration compared to a coffee beverage produced for the same pre-determined amount of coffee grounds under the same brewing conditions (e.g. coffee grounds, including amount of coffee grounds, grind size and/or coffee bean species; brewing time; water volume; brewing temperature; pressure in the brewing chamber; and water flow rate) other than using a brew chamber having a smaller diameter (i.e. smaller brew area). In certain embodiments, a "reduced terpene content" may be a terpene content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, or about 4 mg/l or less.

In certain embodiments, a "reduced terpene content" may be a diterpene content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, or about 4 mg/l or less.

In certain embodiments, a "reduced terpene content" may be a combined cafestol and kahweol content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, or about 4 mg/l or less.

In certain embodiments, a "reduced terpene content" may be a cafestol content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, about 4 mg/l or less, about 3 mg/l or less, or about 2 mg/l or less.

In certain embodiments, a "reduced terpene content" may be a kahweol content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, about 4 mg/l or less, about 3 mg/l or less, or about 2 mg/l or less.

The terpene or diterpene content of a coffee beverage may be determined by HPLC analysis as described in the examples that follow in relation to cafestol and kahweol content.

In certain embodiments, the coffee beverage described herein may be a coffee beverage other than a filter coffee, for example the coffee beverage may be produced without using a filter, e.g. a filter paper. In certain embodiments the coffee beverage may be an espresso, French press coffee or Turkish coffee. In certain embodiments, the coffee beverage may be an espresso, for example a single shot of espresso.

In certain embodiments the coffee beverage has a Brix value of at least about 1.5%. In certain embodiments, the coffee beverage has a Brix value of at least about 2%, for example about at least about 2.1%, at least about 2.2%, at least about 2.3%, or at least about 2.4% or greater. In certain embodiments, the coffee beverage has a Brix value of about 2.5% or greater, about 2.6% or greater, about 2.7% or greater, about 2.8% or greater, about 2.9% or greater, about 3% or greater, about 3.1% or greater, about 3.2% or greater, about 3.3% or greater, about 3.4% or greater, about 3.5% or greater, about 3.6% or greater, about 3.7% or greater, about 3.8% or greater, about 3.9% or greater, or about 4% or greater. The Brix value may be as determined using a refractometer.

In certain embodiments, the coffee beverage has a Brix value of about 1.5% to about 8%, for example about 1.5% to about 6%, about 2% to about 6%, or about 4% to about 6%.

The Brix value of a coffee beverage is measured using a refractometer (for example a digital hand-held 'pocket' refractometer such as Atago® 3830 PAL-3 Full Range Digital Hand-Held Pocket Refractometer). A 1% Brix value of a coffee beverage, for example a coffee beverage provided as described herein, has been found to correspond with an extracted soluble mass concentration of 8.25 mg/ml. The Brix value is used as an indication of the strength of a coffee beverage since it has a clear relation to the dissolved solids in coffee.

The term "brew chamber" used herein is used to refer to a chamber in which coffee grounds are supported during brewing. The diameter D of the brew chamber may refer to the maximum diameter across the brew chamber. In certain embodiments the brew chamber comprises a platform, e.g. a circular platform, on which coffee grounds may be supported during brewing, the diameter D of the brew chamber may be taken to be the diameter of the platform. In certain embodiments the brew chamber has a cylindrical shape, the diameter is then taken to be the diameter of the cylinder. In certain embodiments the brew chamber may have a tapering shape, for example a cylinder of narrowing diameter. The diameter of a brew chamber with a tapering shape may be the average diameter of the brew chamber. The brew area A of the brew chamber may refer to the surface area of the surface, for example brewing platform, on which the coffee grounds are supported in the brew chamber. In certain embodiments, the brew area A is calculated based on the maximum diameter of the brew chamber. In certain embodiments, the brew area A is calculated based on the average diameter of the brew chamber. In certain embodiments, the brew area A is calculated from the average diameter of the volume of the brew chamber which contains coffee grounds. In certain embodiments the brew area A is calculated by dividing the volume of coffee grounds contained in the brew chamber (for example the volume of coffee grounds contained in the brew chamber after a tamping force has been applied to the coffee grounds) by the depth of coffee grounds in the brew chamber (for example the depth of coffee grounds in the brew chamber after a tamping force has been applied to the coffee grounds).

In certain embodiments, the brew chamber has a diameter of at least about 48 mm, for example at least about 50 mm, at least about 51 mm, at least about 52 mm, at least about 53 mm, at least about 54 mm, at least about 55 mm, at least about 56 mm, at least about 57 mm, at least about 58 mm, at least about 59 mm, or at least about 60 mm. In certain embodiments, the brew chamber has a diameter of up to about 110 mm, for example up to about 105 mm, up to about 100 mm, up to about 90 mm, up to about 80 mm, or up to about 70 mm.

In certain embodiments, the brew area A is at least about 20 cm$^2$, for example at least about 21 cm$^2$, at least about 22 cm$^2$, at least about 23 cm$^2$, at least about 24 cm$^2$, at least about 25 cm$^2$, at least about 26 cm$^2$, at least about 27 cm$^2$, at least about 28 cm$^2$, at least about 29 cm$^2$, or at least about 30 cm$^2$. In certain embodiments, the brew area A is up to about 100 cm$^2$, for example up to about 80 cm$^2$, up to about 60 cm$^2$, up to about 50 cm$^2$, or up to about 40 cm$^2$.

As used herein the term the "volume of water V" which is provided to the brew chamber to flow through the coffee grounds in the brew chamber to produce a coffee beverage refers to the volume of water that flows to and out of the coffee grounds held in the brew chamber, i.e. the total volume of water supplied from a water supply unit may be greater than the volume of water V due to a "dead volume" of water contained in a water pipe between the water supply unit and the brew chamber, and also due to water that is introduced to the coffee grounds, but does not leave the coffee grounds. In certain embodiments, the volume of water V can be taken to be the final volume of the coffee beverage produced by the method or apparatus described herein.

In certain embodiments, the volume of water V provided to the brew chamber to flow through the coffee grounds in the brew chamber to produce a coffee beverage is less than about 150 ml, for example about 100 ml or less, about 80 ml or less, or about 60 ml or less. In certain embodiments, the volume of water provided to the brew chamber is in the range of about 20 to about 150 ml, for example about 20 to about 100 ml, about 20 to about 90 ml, about 20 to about 80 ml, or about 30 to about 60 ml.

In certain embodiments, a coffee beverage producing apparatus comprises a water supply unit for supplying a volume of water V, for example heated and pressurised water, to the brew chamber. In certain embodiments, the water supply unit is configured to supply a volume of water V to flow through coffee grounds in the brew chamber and out of the brew chamber to provide a coffee beverage. In certain embodiments, the water supply unit is configured to supply less than about 150 ml water to flow through the brew chamber to produce a coffee beverage, for example about 100 ml or less, about 80 ml or less, or about 60 ml or less. In certain embodiments, the water supply unit is configured to supply about 20 to about 150 ml, for example about 20 to about 100 ml, about 20 to about 90 ml, about 20 to about 80 ml, or about 30 to about 60 ml water to flow through the brew chamber to produce a coffee beverage.

In some examples, the total volume of water supplied to the brew chamber (for example including a "dead volume" of water contained in a water pipe between a water supply unit and the brew chamber, and also a volume of water that is introduced to the coffee grounds, but does not leave the coffee grounds) is less than about 150 ml, for example about 100 ml or less, or about 80 ml or less. In certain embodiments, the total volume of water supplied to the brew chamber is about 40 to about 150 ml, for example about 40 to about 100 ml, or about 40 to about 80 ml.

In certain embodiments the time taken t for the volume of water V to flow through the coffee grounds is about 35 seconds or less, for example about 30 seconds or less. In certain embodiments the time taken for the volume of water V to flow through the coffee grounds is in the range of about 15 and about 35 seconds, for example between about 20 and about 30 seconds. The time taken for the volume of water V to flow through the coffee grounds in the brew chamber, for example through the coffee grounds and out of the brew chamber, may be referred to as the brew time t. For example, the time taken t for water to flow through coffee grounds in the brew chamber is the time from when the water first contacts the coffee grounds to the time the last drop of water leaves the coffee grounds to exit the brew chamber. In certain embodiments, the time t may be taken to be the time for which a pressure of at least about 3 bar is applied to the brew chamber, for example a time for which a pump supplying pressurised water to the brew chamber is switched on.

In certain embodiments, the flow rate F of water through the coffee grounds, for example water flowing through the brew chamber which contains coffee grounds, is in the range of about 1 to 4 ml/s, for example about 1.5 to about 3.5 ml/s, or about 2 to about 3 ml/s.

In certain embodiments, the ratio F/A is about 0.15 cm/s or less, for example about 0.14 cm/s or less, about 0.13 cm/s or less, about 0.12 cm/s or less, about 0.11 cm/s or less, or about 0.10 cm/s or less. In certain embodiments, the ratio F/A is at least about 0.05 cm/s, for example at least about 0.06 cm/s, or at least about 0.07 cm/s. In certain embodiments, the ratio F/A is in the range of about 0.05 cm/s to about 0.15 cm/s.

In certain embodiments, the method comprises pressurising the brew chamber, optionally pressurising the brew chamber to a pressure of at least about 3 bar, for example at least about 4 bar. In certain embodiments, the brew chamber is pressurised to a pressure in the range of about 3 to about 10 bar, for example a pressure in the range of about 3 to about 8 bar or in the range of about 4 to about 6 bar, or 4 to about 5 bar.

In certain embodiments the apparatus comprises a brew chamber pressurising unit, optionally configured to apply a pressure of at least about 3 bar, for example at least about 4 bar to the brew chamber. In certain embodiments, the apparatus comprises a brew chamber pressurising unit configured to apply a pressure to water flowing through the brew chamber in the range of about 3 to about 8 bar to the brew chamber, for example about 4 to about 6 bar, or about 4 to about 5 bar to the brew chamber.

In certain embodiments, water having a temperature in the range of about 84 to about 96° C. is provided to the brew chamber.

In certain embodiments, the water supply unit comprises a heating unit to heat water to a temperature in the range of about 84 to about 96° C.

In certain embodiments, the brew chamber has a diameter D and holds or is configured to hold an amount of coffee grounds X, wherein the ratio of $X/D^2$ is less than about 0.30 g/cm². In certain embodiments, the ratio of $X/D^2$ is about 0.29 g/cm² or less, about 0.28 g/cm² or less, about 0.27 g/cm² or less, about 0.26 g/cm² or less, about 0.25 g/cm² or less, about 0.24 g/cm² or less, about 0.23 g/cm² or less, about 0.22 g/cm² or less, about 0.21 g/cm² or less, or about 0.20 g/cm² or less.

In certain embodiments, the ratio of $X/D^2$ is in the range of about 0.10 g/cm² to less than about 0.30 g/cm², for example about 0.15 g/cm² to less than about 0.30 g/cm², or about 0.15 g/cm² to about 0.20 g/cm².

In certain embodiments, a method for providing a coffee beverage having a reduced terpene content may comprise:

providing a brew chamber comprising a platform supporting an amount of coffee grounds X, the brew chamber having a brew area A; and providing a volume of water to flow through the coffee grounds in the brew chamber and out of the brew chamber to provide a coffee beverage, wherein the ratio of X/A is less than about 0.40 g/cm².

In certain embodiments, a coffee beverage producing apparatus for providing a coffee beverage having a reduced terpene content is provided, the apparatus comprising a brew chamber having an inlet for receiving a volume of water and an outlet through which a coffee beverage produced in the brew chamber exits the brew chamber, wherein the brew chamber platform has a brew area A and is configured to hold an amount of coffee grounds X, wherein the ratio of X/A is less than about 0.40 g/cm²

In certain embodiments, the ratio of X/A is about 0.39 g/cm² or less, or about 0.38 g/cm² or less.

In certain embodiments, the ratio of X/A is in the range of about 0.10 g/cm² to less than about 0.40 g/cm², for example about 0.15 g/cm² to less than about 0.40 g/cm².

In certain embodiments, the brew chamber referred to herein may be a capsule, pod or pad. For example, capsules, pods or pads comprising coffee grounds. Coffee ground containing capsules, pods or pads are known to the skilled person as referring to various coffee ground containing vessels which may be inserted directly into a coffee beverage producing machine. The coffee grounds are maintained within the capsule or pad during brewing and therefore the capsule or pad can be considered to be a brew chamber as described herein in that the diameter of the capsule or pad for a pre-determined amount of coffee grounds affects the terpene content of the coffee beverage produced as described herein.

In certain embodiments, the capsules, pods or pads referred to herein may comprise an amount of coffee grounds X. In certain embodiments, the capsules, pods or pads may have a diameter D and the ratio $X/D^2$ may be as described above.

In certain embodiments the amount of coffee grounds X provided to or contained in the brew chamber is at least about 5 g, for example at least about 6 g. In certain embodiments, the amount of coffee grounds X provided to or contained in the brew chamber is up to about 12 g, for example up to about 11 g, or up to about 10 g. In certain embodiments, the amount of coffee grounds X provided to or contained in the brew chamber is in the range of about 5 to about 12 grams, for example about 5 to about 10 g, or about 6 to about 10 g.

Providing a coffee beverage may involve determining various brewing conditions. Suitable brewing conditions to provide particular coffee beverages, e.g. espresso, are known to the skilled person. As discussed above, the present inventors have found that the terpene content of a coffee beverage produced under pre-determined brewing conditions, such as coffee grounds type, grind size, amount of coffee, pressure, temperature, brew time and/or amount of water) can be reduced by increasing the diameter, e.g. the brew area A, of the brew chamber.

In certain embodiments, the espresso producing apparatus described herein may be a fully automated espresso producing apparatus.

It is noted that the invention relates to all possible combinations of features recited in the claims. In particular, features referred to herein in relation to a method apply equally to the apparatus, use, capsules, pods or pads referred to herein unless stated otherwise. Likewise, features referred to herein in relation to an apparatus apply equally to the method described herein.

BRIEF DESCRIPTION OF THE DRAWINGS

Aspects of the present invention will now be described in more detail, with reference to the appended drawings showing embodiment(s) of the invention.

DETAILED DESCRIPTION OF THE EMBODIMENTS

Figure 1:
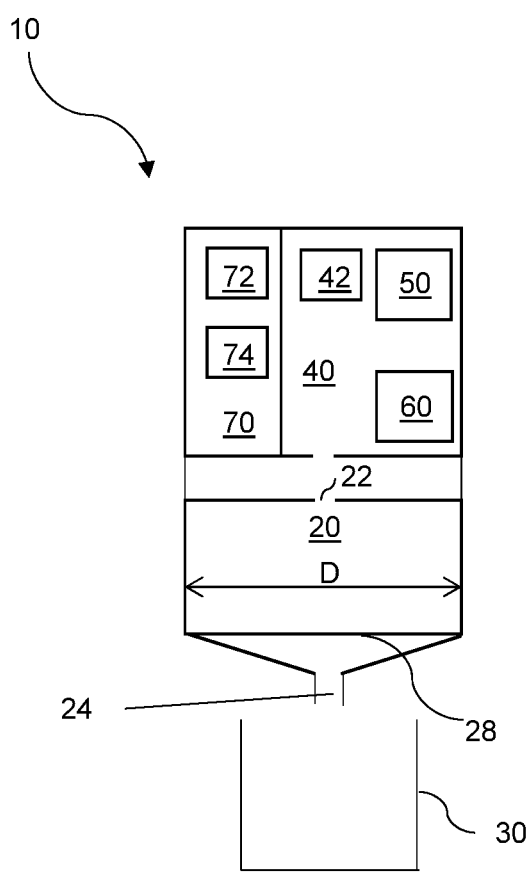
FIG. 1 shows a schematic diagram of a coffee beverage producing apparatus according to the present invention.

The present invention will now be described with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout.

FIG. 1 shows an apparatus 10 for providing a coffee beverage having a reduced terpene content. The apparatus comprises a brew chamber 20 for holding coffee grounds to be brewed to produce a coffee beverage. Coffee grounds are held in the brew chamber 20 during brewing. The brew chamber 20, in this example a cylindrical brew chamber, has a diameter D and a brew area A (calculated as $\pi \cdot D^2/4$) where D is the maximum diameter of the brew chamber. The brew chamber 20 has an inlet 22 for receiving a volume of water and an outlet 24 through which a coffee beverage produced in the brew chamber exits the brew chamber.

In certain embodiments, the brew chamber comprises a platform 28 on which coffee grounds may be supported during brewing. The platform 28 is configured to allow water to flow from the inlet 22 of the brew chamber to the outlet 24 of the brew chamber, for example the platform 28 may be a perforated platform, without allowing coffee grounds to pass through the platform 28. For example, perforations in the platform may have a size which is less than the particle size of the coffee grounds supplied to the brew chamber. In this embodiment, the brew area A is also the surface area of the platform 28 on which coffee grounds may be supported.

During use, a coffee beverage container 30 may be positioned below the brew chamber outlet 24 to collect the coffee beverage produced by the apparatus 10.

The apparatus 10 may comprise a water supply unit 40 for supplying a volume of water to the brew chamber 20. The water supply unit 40 may comprise a water supply dosing unit 42 for supplying a pre-determined volume of water to the brew chamber. The pre-determined volume of water may be the total volume of water supplied to the brew chamber (i.e. including a "dead volume" of water which in use may be contained in a water pipe between a water supply unit and the brew chamber, and also a volume of water that is introduced to the coffee grounds, but does not leave the coffee grounds) required to provide a volume of water V to flow through the coffee grounds to produce a coffee beverage. In certain embodiments, for example for the provision of an espresso coffee beverage, the water dosing supply unit 42 may supply less than about 150 ml water to the brew chamber 20, for example about 40 to about 80 ml of water. In certain embodiments, the water supply unit 40 comprises a water heater unit 50 for heating water before a volume of water is provided to the brew chamber. Water may be heated by the water heater unit 50 to a temperature in the range of about 84 to about 96° C., or heated such that water supplied to the brew chamber 20 has a temperature in the range of about 84 to about 96° C. In certain embodiments, the water supply unit 40 is configured to provide a volume of water flowing through the coffee grounds in the brew chamber 20 at a flowrate in the range of about 2 ml/s to about 3 ml/s. In certain embodiments, the water supply unit 40 comprises a pressurising unit 60, for example a pressurising unit including a pump, for pressurising water to be supplied to the brew chamber 20 and/or to pressurise the brew chamber 20. In certain embodiments, the pressurising unit 60 may comprise a pressure control valve for controlling the pressure applied to the brew chamber 20, for example the pressure of water delivered to the brew chamber 20. In certain embodiments, the pressurising unit 60 is configured to pressurise water, for example water to be supplied to the brew chamber 20 and/or water flowing through the brew chamber to a pressure of at least about 3 bar, for example at least about 4 bar, optionally to a pressure in the range of about 3 bar to about 8 bar, or a range of about 3 bar to about 5.5 bar, optionally in the range of about 4 to 5 bar. In certain embodiments, the pressure control valve of the pressuring unit 60 may be configured to control the pressure of water delivered to the brew chamber and/or the pressure of the brew chamber, to a pressure of at least about 3 bar, for example at least about 4 bar, optionally to a pressure in the range of about 3 bar to about 8 bar, or a range of about 3 bar to about 5.5 bar, optionally in the range of about 4 to 5 bar. Pressures in these ranges are suitable for providing an espresso coffee beverage. In certain embodiments, the pressurising unit 60, optionally in combination with the pressure control valve, pressurises water supplied to the brew chamber 20 such that water having a flowrate in the range of about 2 ml/s to about 3 ml/s is flowed through the coffee grounds in the brew chamber 20.

The apparatus 10 may comprise a coffee grounds supply unit 70 for supplying coffee grounds to the brew chamber 20. The coffee grounds supply unit 70 may comprise a coffee grounds dosing unit 72 for supplying a pre-determined amount X of coffee grounds to the brew chamber 20. The coffee grounds supply unit may comprise a coffee bean grinding unit 74 for grinding coffee beans to produce coffee grounds for supply to the brew chamber 20.

The apparatus 10 may comprise a tamping unit (not shown) for providing a tamping force to the coffee grounds in the brew chamber 20 to provide a coffee pellet. Applying a tamping force to the coffee grounds compresses the grounds and allows water to permeate evenly through the coffee pellet during brewing. The tamping force may be modified in order to ensure the time the volume of water takes to flow through the coffee grounds is in the range of about 15 to about 35 seconds.

During use, an amount of coffee grounds X may be provided to the brew chamber 20, for example the amount of coffee grounds X may be provided to the brew chamber by the coffee grounds dosing unit 72 of the coffee grounds supply unit 70. A volume of water is then provided, for example from the water supply unit 40, to flow through the coffee grounds in the brew chamber 20 and out of the brew chamber 20 to provide a coffee beverage. The brewing conditions in the brew chamber 20 may be controlled as described herein. For example, controlling the brewing conditions may comprise controlling the amount of coffee grounds provided to the brew chamber, the particle size of the coffee grounds, the volume of water supplied to the coffee grounds, the brewing temperature (for example the temperature of the water supplied to the coffee grounds), the brewing pressure (i.e. the pressure of water supplied to the brew chamber), the brewing time (for example, the time taken for water to flow through the coffee grounds in the brew chamber), the flowrate of water through the coffee grounds in the brew chamber and/or the tamping force applied to the coffee grounds in the brew chamber.

Figure 2:
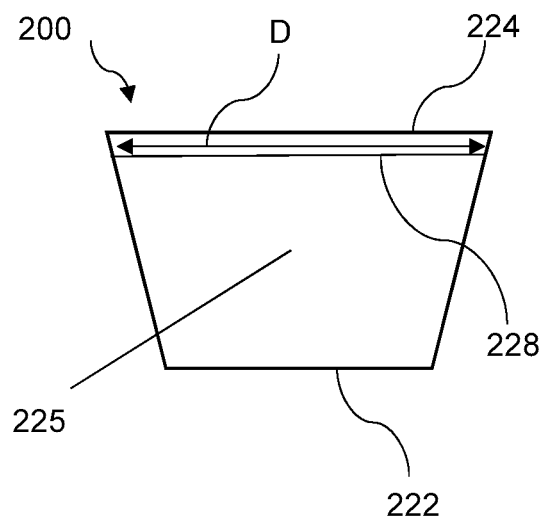
FIG. 2 is a schematic illustration of a capsule.

FIG. 2 is a schematic diagram of a capsule 200 according to the present invention. The capsule 200 is a sealed container containing coffee grounds 225. The capsule comprises a perforatable base 224 and a perforatable top 222. Once inserted into a suitable coffee machine, a perforation(s) may be made in the perforatable top 222 to form an inlet into which water may flow to reach the coffee grounds 225 and perforations may also be made in the perforatable base 224 so that the coffee beverage produced by water flowing through the coffee grounds in the capsule 200 may exit the capsule. The capsule 200 may comprise a platform 228 on which coffee grounds may be supported during use. The capsule 200 may be considered to be a brew chamber as heated and pressurised water may be flowed through the capsule 200 containing coffee grounds 225 to provide a coffee beverage. The diameter D of the capsule may be considered to be the diameter of the platform 228. In certain embodiments, the diameter D may be considered to be the average diameter of the capsule 200.

Figure 3:
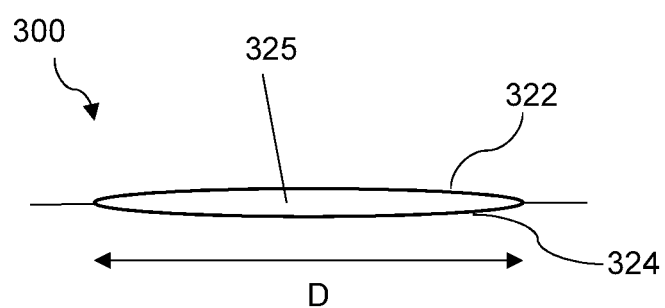
FIG. 3 is a schematic illustration of a pad.

FIG. 3 is a schematic diagram of a pad 300 according to the present invention. The pad 300 is a container containing coffee grounds 325. The pad comprises a top 322 and a base 324 through which water may flow. In certain embodiments, either the top 322 or base 324 may function as the water inlet and either the top 322 or base 324 may function as the water outlet. The diameter D of the pad 300 may be considered to be the maximum diameter across the section of the pad 300 containing coffee grounds 325. The pad 300 may be considered to be a brew chamber as heated and pressurised water may be flowed through the pad 300 containing coffee grounds 325 to provide a coffee beverage.

The present inventors have found that a coffee beverage comprising reduced levels of terpenes, for example cafestol and/or kahweol, may be prepared by increasing the diameter of a brew chamber used to brew a given amount of coffee grounds. Without wishing to be bound by theory it is considered that the use of a larger diameter brew chamber for a pre-determined amount of coffee grounds reduces shear rate between coffee grounds in the brew chamber as water flows through the brew chamber. It is also considered, again without wishing to be bound by theory, that the use of a larger diameter brew chamber for a pre-determined amount of coffee grounds reduces the velocity of water flowing through the coffee grounds. It has been found that by maintaining other brewing parameters such as amount of coffee, brew time, amount of water, pressure of brewing, temperature of brewing and coffee grind size, the quality level of the coffee in terms of taste and/or aroma may be maintained and the terpene content of the coffee beverage be reduced compared to coffee brewed using the same brewing parameters and a smaller diameter brew chamber.

EXAMPLES

The inventors investigated the effect of brew chamber diameter for a pre-determined amount of coffee grounds and the associated levels of terpenes contained in the resulting coffee beverages.

Example 1

A coffee brewing rig was used to provide a single shot of espresso. The diameter D of the brew chamber was 58 mm and the brew area A was calculated to be 26.42 cm$^2$. 10 g of Illy® pre-ground espresso coffee was provided to the brew chamber and lightly pressed by hand using a stamper to provide a homogeneous coffee grounds layer. Water was supplied to the brew chamber from a water supply unit comprising a water heater, the water was heated to 90° C. before being supplied to the brew chamber. Heated water was supplied to the brew chamber at a pressure of 4.5 bar and a flow rate of 2.5 ml/s such that the volume of coffee beverage produced was 50 ml (i.e. V was 50 ml). The brew time for the espresso was 20 seconds (i.e. it took 20 seconds for the water supplied to the brew chamber to flow through the coffee grounds). This example was repeated twice to provide three samples of a single shot of espresso.

The F/A ratio for the method and apparatus used in this example is 0.0946 cm/s.

Comparative Example 1

Example 1 was repeated except that a brew chamber with a diameter D of 42 mm (brew area A of 13.85 cm$^2$) was used. As for Example 1, this example was repeated twice to provide three samples of a single shot of espresso.

The F/A ratio for the apparatus used in this example is 0.180 cm/s.

The Brix value and the cafestol and kahweol content of the espressos produced according to Example 1 and Comparative Example 1 were determined as described below.

Determination of Cafestol and Kahweol Content

From each of the three espressos of Example 1 and Comparative Example 1 three samples were taken from each and analysed for their cafestol and kahweol concentrations.

Each of the coffee beverage samples were dried to form dried extracts and the dried extracts of the coffee samples were reconstituted in 1.0 ml pure methanol (Fisher Scientific, HPLC grade) by mixing them for 10 minutes on a Thermo-mixer. Subsequently, 100 μl of sample solution was transferred to an Agilent PP-insert (used in combination with an Agilent HPLC-vial) and centrifuged to remove undissolved salts. The resulting samples were directly injected (20 μl) into the HPLC system. For the calibration curves, concentration standards of cafestol (Alfa Ceasar, J65355) and kahweol (LKT Laboratories Inc., K0030, >99.5%) were prepared in methanol.

For the HPLC analysis two serially placed Zorbax Eclipse XDB-C18 columns (4.6×150 mm, 5 μm) were used and held at the temperature T=40° C. A water/acetonitrile gradient was used as eluent and the flow rate was set to 1 ml/min. Cafestol and kahweol were optically detected at wavelengths of 225 nm and 290 nm respectively.

The arithmetic mean concentration of cafestol and kahweol in espresso obtained as described in Example 1 and espresso obtained as described in Comparative Example 1 was calculated. The results are presented in FIG. 4.

Determination of Brix Value

A digital hand-held 'pocket' refractometer (Atago® 3830 PAL-3) was used according to the instruction manual to determine the Brix value for each of the coffee beverage samples obtained as described in Example 1 and Comparative Example 1. The results are presented in FIG. 4.

Example 2

Example 2 was carried out as per Example 1 except that 6 g of coffee grounds were provided to the brew chamber, the volume of water V was 45 ml and the brew time t was 17 seconds.

The F/A ratio for the apparatus used in this example is 0.100 cm/s.

Comparative Example 2

Comparative Example 2 was carried out as per Comparative Example 1 except that 6 g of coffee grounds were provided to the brew chamber, the volume of water V was 46 ml and the brew time t was 17 seconds.

The F/A ratio for the apparatus used in this example is 0.195 cm/s.

Comparative Example 3

Comparative Example 3 was carried out as per Example 2 except that a brew chamber with a diameter D of 26 mm was used, the volume of water V was 47 ml and the brew time t was 17 seconds.

The F/A ratio for the apparatus used in this example is 0.443 cm/s.

The Brix value and the cafestol and kahweol content of the espressos produced according to Examples 2 and 3 and Comparative Example 2 were determined as described above. The results are presented in FIG. 5.

Figure 4:
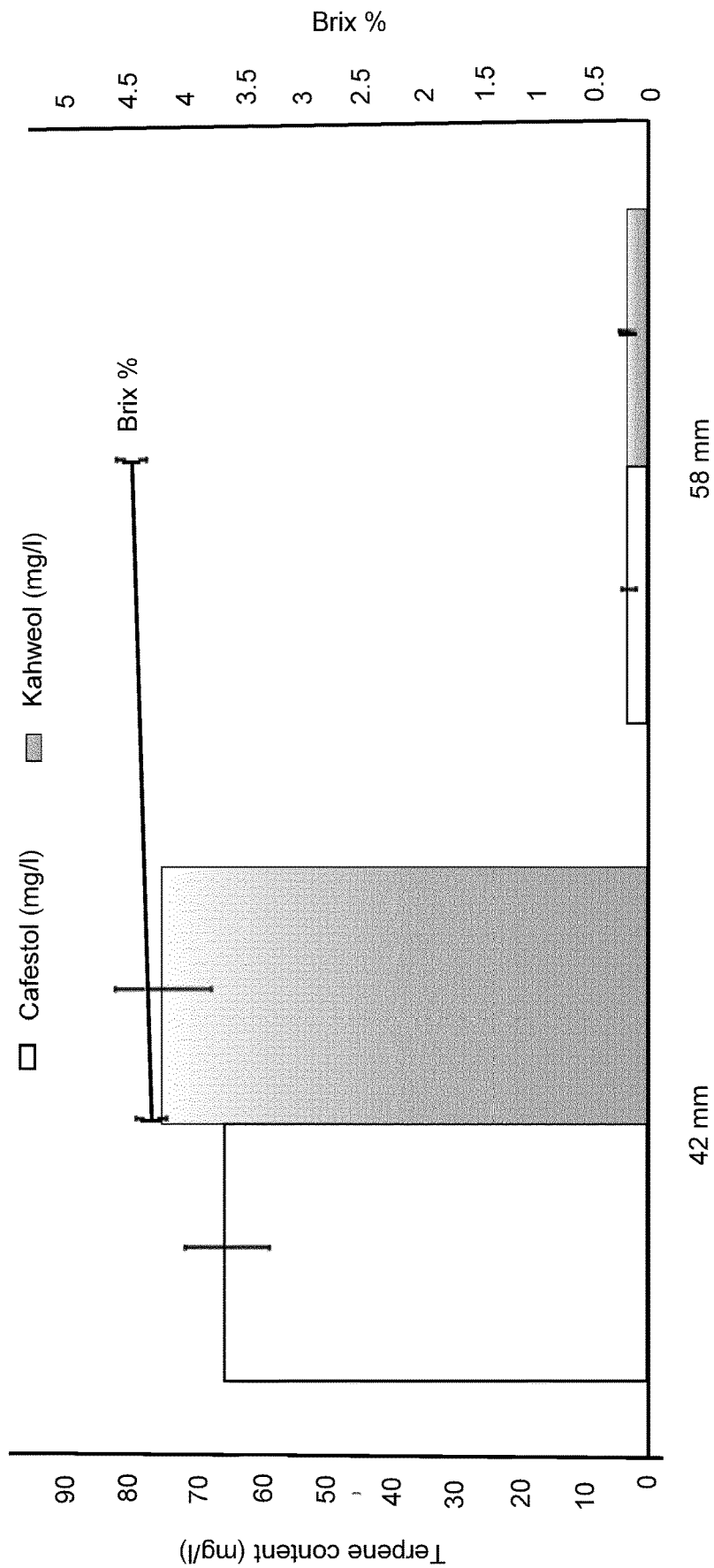
FIG. 4 is a graph showing the effect of brew chamber diameter on the cafestol and kahweol content and the Brix value of a coffee beverage.
Figure 5:
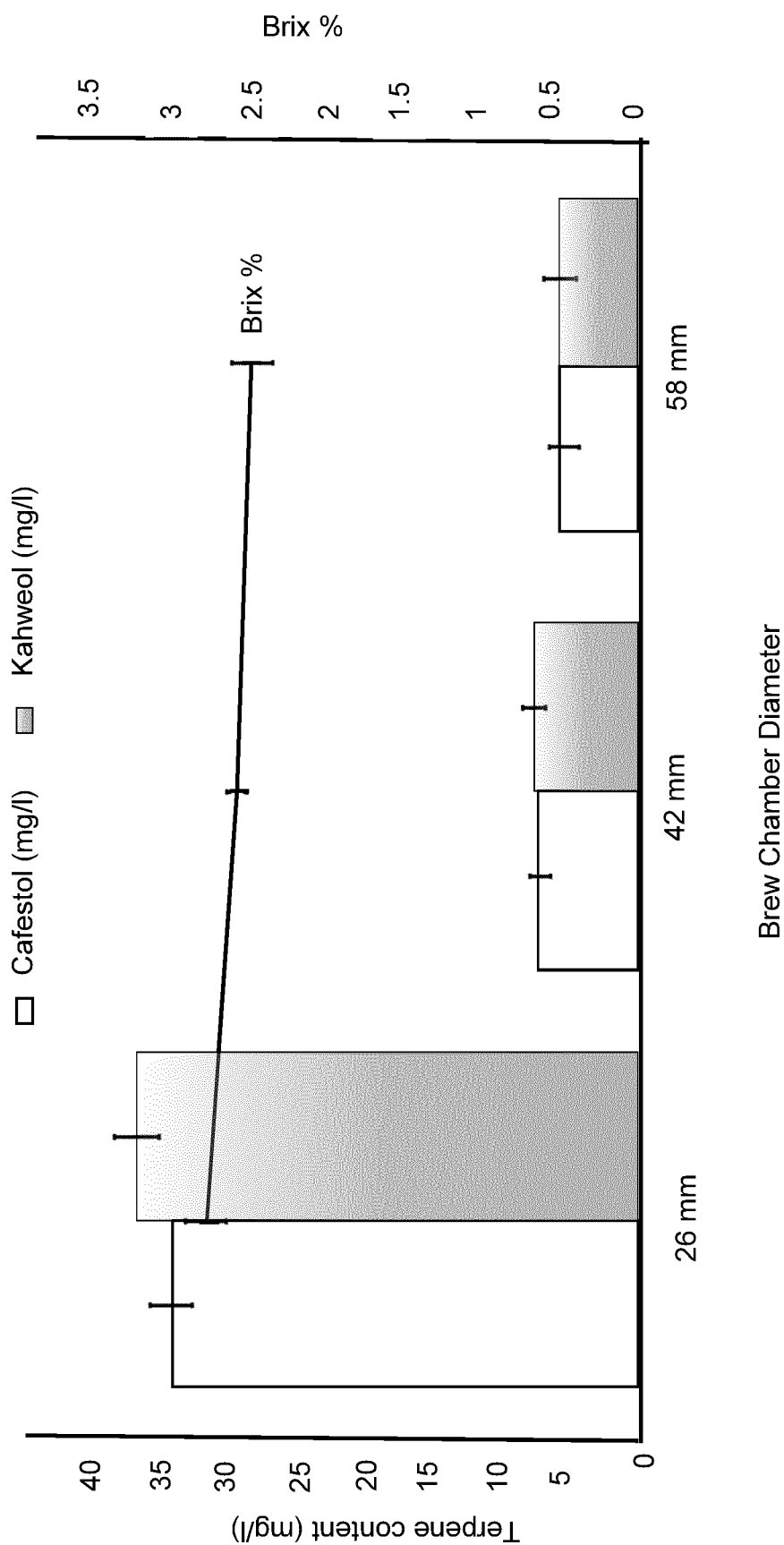
FIG. 5 is a graph showing the effect of brew chamber diameter on the cafestol and kahweol content and the Brix value of a coffee beverage.

From FIGS. 4 and 5 it can be seen that increasing the diameter of the brew chamber for a given amount of coffee grounds reduces the diterpene content of a coffee beverage without affecting the taste or intensity of the coffee beverage (as indicated by the Brix value).

The person skilled in the art realizes that the present invention is by no means limited to the preferred embodiments described above. On the contrary, many modifications and variations are possible within the scope of the appended claims.

Additionally, variations to the disclosed embodiments can be understood and effectuated by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A method for providing a coffee beverage having a reduced terpene content, the method comprising:
   providing a brew chamber supporting coffee grounds, the brew chamber having a brew area A, wherein the brew area A is a surface area of a surface on which the coffee grounds are supported in the brew chamber; and
   providing a volume of water V to flow through the coffee grounds in the brew chamber and out of the brew chamber to provide the coffee beverage,
   wherein a flow rate of water through the coffee grounds F is V/t, where t is the time taken for the volume of water V to flow through the coffee grounds,
   wherein a ratio of F/A is 0.15 cm/s or less,
   wherein providing the brew chamber having the brew area A reduces the terpene content of the coffee beverage as compared to a brew chamber having a smaller brew area, and
   wherein the coffee beverage has the terpene content of 60 mg/l or less.

2. The method according to claim 1, wherein the ratio of F/A is 0.1 cm/s or less.

3. The method according to claim 1, wherein the brew area A is at least 20 cm$^2$.

4. The method according to claim 1, wherein the reduced terpene content is a diterpene concentration of 60 mg/l or less.

5. The method according to claim 1, wherein the reduced terpene content is a total cafestol and/or kahweol content of 60 mg/l or less.

6. The method according to claim 1, wherein the coffee beverage has a Brix value of 4% or greater.

7. The method according to claim 1, wherein the volume of water V provided to flow through the coffee grounds in the brew chamber is in the range of 30 ml to 80 ml.

8. The method according to claim 1, wherein the flow rate of water through the coffee grounds F is in the range of 2 ml/s to 3 ml/s.

9. The method according to claim 1, wherein the time t is in the range of 15 seconds to 35 seconds.

10. The method according to claim 1, further comprising pressurising the brew chamber to a pressure of at least 3 bar.

11. The method according to claim 1, wherein an amount of the coffee grounds provided to the brew chamber is in the range of 5 g to 12 g.

12. An espresso producing apparatus for providing an espresso coffee beverage having a reduced terpene content, the espresso producing apparatus comprising:
   a brew chamber for holding coffee grounds, the brew chamber having an inlet for receiving a volume of water V and an outlet through which the espresso coffee beverage produced in the brew chamber exits the brew chamber, wherein a flow rate of water through the coffee grounds F is V/t, where t is the time taken for the volume of water V to flow through the coffee grounds, wherein the brew chamber has a brew area A of at least 20 cm$^2$, and wherein the brew area A is a surface area of a surface on which the coffee grounds are supported in the brew chamber;
   a tamping unit for providing a tamping force to the coffee grounds in the brew chamber to provide a coffee pellet; and
   a water supply unit configured to supply the volume of water to the brew chamber at the flow rate F such that a ratio F/A is 0.15 cm/s or less.

13. The espresso producing apparatus of claim 12, wherein the flow rate F is in the range of 2 ml/s to 3 ml/s.

14. A method to provide an espresso coffee beverage having a reduced terpene content, the method comprising:
   providing a brew chamber, wherein the brew chamber has a brew area A of at least 20 cm$^2$, and wherein the brew area A is a surface area of a surface on which coffee grounds are supported in the brew chamber,
   wherein providing the brew chamber having the brew area A reduces the terpene content of the espresso coffee beverage as compared to a brew chamber having a smaller brew area, and
   wherein the espresso coffee beverage has the terpene content of 60 mg/l or less.

15. The method according to claim 14, wherein the brew chamber is a capsule, pod, or pad.

16. The method according to claim 1, further comprising:
   providing a tamping force to the coffee grounds in the brew chamber to provide a coffee pellet,
   wherein providing the tamping force to the coffee grounds in the brew chamber compresses the coffee grounds and allows water to permeate evenly through the coffee pellet during brewing.

17. The espresso producing apparatus of claim 12, wherein the brew chamber having the brew area A reduces the terpene content of the espresso coffee beverage as compared to a brew chamber having a smaller brew area, and
   wherein the espresso coffee beverage has the terpene content of 60 mg/l or less.

18. The espresso producing apparatus of claim 12, wherein the provision of the tamping force to the coffee grounds in the brew chamber compresses the coffee grounds and allows water to permeate evenly through the coffee pellet during brewing, and
   wherein the tamping force is modified in order to ensure that the time t is in range of 15 to 35 seconds.

* * * * *